(12) United States Patent
Boukhayma

(10) Patent No.: US 11,252,352 B2
(45) Date of Patent: Feb. 15, 2022

(54) PIXEL SENSOR CELL FOR CMOS IMAGE SENSORS WITH ENHANCED CONVERSION GAIN AT HIGH DYNAMIC RANGE CAPABILITY

(71) Applicant: Ecole Polytechnique Fédérale de Lausanne (EPFL), Lausanne (CH)

(72) Inventor: Assim Boukhayma, Neuchâtel (CH)

(73) Assignee: ECOLE POLYTECHNIQUE FÉDÉRALE DE LAUSANNE (EPFL), Lausanne (CH)

( * ) Notice: Subject to any disclaimer, the term of this patent is extended or adjusted under 35 U.S.C. 154(b) by 0 days.

(21) Appl. No.: 16/765,036

(22) PCT Filed: Nov. 20, 2017

(86) PCT No.: PCT/EP2017/079751
§ 371 (c)(1),
(2) Date: May 18, 2020

(87) PCT Pub. No.: WO2019/096420
PCT Pub. Date: May 23, 2019

(65) Prior Publication Data
US 2020/0404199 A1    Dec. 24, 2020

(51) Int. Cl.
*H04N 5/355* (2011.01)
*H04N 5/374* (2011.01)

(52) U.S. Cl.
CPC ........... *H04N 5/3559* (2013.01); *H04N 5/374* (2013.01)

(58) Field of Classification Search
None
See application file for complete search history.

(56) References Cited

U.S. PATENT DOCUMENTS 6,975,356 B1 * 12/2005 Miyamoto ........... H04N 5/3575
348/300
7,408,210 B2    8/2008 Ogura et al.
(Continued)

FOREIGN PATENT DOCUMENTS

| EP | 2 890 117 | 7/2015 |
| EP | 2 919 457 | 9/2015 |
| WO | WO 2006124346 | 11/2006 |

OTHER PUBLICATIONS

Boukhayma, A., et al. "A CMOS Image Sensor Pixel Combining Deep Sub-Electron Noise with Wide Dynamic Range," IEEE Electron Device Letters, 41(6): 880-883 (2020).
(Continued)

*Primary Examiner* — Cynthia Segura
(74) *Attorney, Agent, or Firm* — HoustonHogle LLP

(57) ABSTRACT

The present invention relates to a pixel sensor cell (1) for a CMOS sensor device comprising: —a photodiode (11) for generating photoelectrons; —a first transfer transistor (12) coupling the photodiode (11) with an intermediate node (IN) and configured to be controlled by a first control signal ($TX_1$); —a gain reducing capacitance ($C_{HD}$) applied on the intermediate node (IN); —a second transfer transistor (14) coupling the intermediate node (IN) with a sense node (SN) and configured to be controlled by a second control signal ($TX_2$); —an output buffer (15) coupled with the sense node (SN) and configured to amplify a potential on the sense node (SN).

12 Claims, 6 Drawing Sheets

(56) References Cited

U.S. PATENT DOCUMENTS

| | | | |
|---|---|---|---|
| 7,719,590 | B2 | 5/2010 | Ellis-Monaghan et al. |
| 7,948,535 | B2* | 5/2011 | Ellis-Monaghan ............... H04N 5/3559 348/294 |
| 10,397,500 | B1* | 8/2019 | Xu ................. H04N 5/37452 |
| 2006/0219868 | A1 | 10/2006 | Morimoto et al. |
| 2006/0261246 | A1* | 11/2006 | Krymski ............. H04N 5/3653 250/208.1 |
| 2013/0020466 | A1* | 1/2013 | Ayers ................. H04N 5/243 250/208.1 |
| 2013/0141619 | A1* | 6/2013 | Lim ................. H04N 5/3559 348/302 |
| 2015/0055002 | A1* | 2/2015 | Beck ................. H04N 5/3559 348/308 |
| 2015/0350574 | A1* | 12/2015 | Okado ................. H04N 5/378 348/308 |
| 2016/0112665 | A1* | 4/2016 | Meynants ......... H04N 5/23245 250/208.1 |
| 2016/0148962 | A1 | 5/2016 | Dupont |
| 2016/0337567 | A1* | 11/2016 | Okura ................. H01L 29/945 |
| 2017/0148832 | A1 | 5/2017 | Yamashita |
| 2019/0141270 | A1* | 5/2019 | Otaka ................. H04N 5/35527 |
| 2020/0043971 | A1* | 2/2020 | Sugawa ............... H04N 5/3559 |
| 2020/0145593 | A1* | 5/2020 | Gao ................. H04N 5/35527 |
| 2020/0162691 | A1* | 5/2020 | Mori ................. H04N 5/378 |

OTHER PUBLICATIONS

International Preliminary Report on Patentability, dated Jun. 4, 2020, from International Application No. PCT/EP2017/079751, filed on Nov. 20, 2017. 12 pages.

Boukhayma, A., et al. "Noise Reduction Techniques and Scaling Effects towards Photon Counting CMOS Image Sensors," Sensors, 16, 514 (2016).

Hara, K., et al., "A linear-logarithmic CMOS sensor with offset calibration using an injected charge signal" ISSCC. 2005 IEEE International Digest of Technical Papers. Solid-State Circuits Conference, 1: 354-603 (2005).

International Search Report, dated Jul. 23, 2018, from International Application No. PCT/EP2017/079751, filed on Nov. 20, 2017. 4 pages.

Kalgi, A.K., et al. "Four Concepts for Synchronous, PSN Limited, True CDS, HDR Imaging," International Image Sensors Workshop,1-4 (2015).

Loose, M., et al., "A self-calibrating single-chip CMOS camera with logarithmic response," IEEE Journal of Solid-State Circuits, 36(4): 586-596 (2001).

Solhusvik, J., et al., "A 1280x960 3.75um pixel CMOS imager with triple exposure HDR," International Image Sensors Workshop, 1-4 (2009).

Written Opinion, dated Jul. 23, 2018, from International Application No. PCT/EP2017/079751, filed on Nov. 20, 2017. 10 pages.

* cited by examiner

PIXEL SENSOR CELL FOR CMOS IMAGE SENSORS WITH ENHANCED CONVERSION GAIN AT HIGH DYNAMIC RANGE CAPABILITY

RELATED APPLICATIONS

This application is a § 371 National Phase Application of International Application No. PCT/EP2017/079751, filed on Nov. 20, 2017, now International Publication No. WO 2019/096420 A1, published on May 23, 2019, which is incorporated herein by reference in its entirety.

TECHNICAL FIELD

The present invention relates to CMOS image sensors comprising a high number of pixels formed by pixel sensor cell having pinned photodiodes and CMOS integrated circuitry. Furthermore, the present invention relates to measures for readout noise reduction and increase of dynamic range of such CMOS image sensors.

TECHNICAL BACKGROUND

CMOS image sensors are widely applied in technical devices, such as mobile devices or digital cameras. While the development of the pinned photodiodes (buried photodiodes) dramatically increased noise performance of CMOS image sensors, the characteristics of conventional CMOS image sensors still have limitations with respect to sensitivity and dynamic range.

A conventional pixel sensor cell is exemplarily shown in document A. Boukhayma, A. Peizearat and C. Enz, "Noise Reduction Techniques and Scaling Effects towards Photon Counting CMOS Image Sensors", Sensors 2016, 16, 514, http://www.mbpi.com/thermal/sensors. The conventional pixel sensor cell includes a pinned photodiode and generally four transistors which include a transfer transistor separating the pinned photodiode from a sense node, reset and row selection transistors and a source follower transistor that buffers the voltage level of the sense node.

The transfer transistor is used to control a potential barrier for charge carriers stored/generated in the pinned photodiode. When the gate voltage of the transfer transistor is low enough and the resulting potential in the channel of the transfer transistor is lower than the photo-generated voltage of the pinned photodiode, the integrated charge stored in the pinned photodiode is kept. When the gate voltage of the transfer transistor is set to a high voltage, a depletion in the channel of the transfer transistor is created so that the potential is higher than the charge potential of the pinned photodiode and also lower than a reset potential of the sense node. So, the electrons accumulated in the pinned photodiode during an integration phase flow towards the higher potential area of the sense node through the transfer transistor and the voltage level of the sense node drops from the reset potential depending on the transferred charge.

The voltage of the sense node is sensed by an adequate electronic circuit after resetting the sense node to the reset potential and after the charge of the photodiode has been allowed to flow onto the sense node. The sensed potentials are subtracted to obtain the signal level. This sensing method is called correlated double sampling and allows the reduction of noise that is correlated between the reset time and the transfer time.

While above architecture of the pixel sensor cell and the method of operation provide a good noise characteristic and a reasonable dynamic range, there is a further demand for CMOS image sensors with an even better sensitivity and a higher dynamic range.

Regarding an enhancement of the dynamic range, several techniques have been proposed in document K. Hara, H. Kubo, M. Kimura, F. Murao, and S. Komori, "A linear-logarithmic CMOS sensor with offset calibration using an injected charge signal" in ISSCC. 2005 IEEE International Digest of Technical Papers. Solid-State Circuits Conference, 2005, February 2005, pp. 354-603 Vol. 1, in document M. Loose, K. Meier, and J. Schemmel, "A self-calibrating single-chip CMOS camera with logarithmic response," IEEE Journal of Solid-State Circuits, vol. 36, no. 4, pp. 586-596, April 2001 and in document J. S. et al., "A 1280 960 3.75 m pixel CMOS imager with triple exposure HDR," in International Image Sensors Workshop, 2009, September 2009, pp. 1-4 which have the disadvantage of not being linear or not having a single synchronous integration time. Further methods are disclosed in A. K. Kalgi et al., "Four concepts for synchronous, PSN limited, true CDS, HDR imaging", in International Image Sensors Workshop, 2015, September 2015, pp. 1-4. However, methods based on varying the integration time or using multiple different size photodiodes fail having photon-shot-noise limited operation and methods based on acquiring and combining multiple frames at different gains fail to operate in synchronous shutter mode.

From documents EP 2 890 117 A1, U.S. Pat. Nos. 7,408,210, 7,719,590, and US2017/0148832, further approaches are known which allow a linear response and a low readout noise for all lighting conditions and have the possibility to operate in a synchronous shutter mode. These approaches are based on multiple ranges of linear gain so that a high gain is provided for low light signals to ensure a low noise performance, and a low gain is provided for high dynamic signal to avoid saturation. Hence, this method requires a varying sense node capacitance which is embodied by an additional capacitance to be coupled with the sense node by means of a transistor. So, for low-light conditions, the extra capacitance can be disconnected from the sense node to ensure the lowest sense mode capacitance. For high dynamic signals, the extra capacitor can be connected with the sense node in order to increase dramatically the sense node capacitance resulting in a much lower conversion gain and a much larger saturation level. A disadvantage of these approaches is that the additional transistor increases the sense node capacitance and therefore increases the noise flow which affects the overall sensitivity.

SUMMARY OF THE INVENTION

This object has been achieved by the pixel sensor cell according to claim 1, by the method of operating a pixel sensor cell and by the CMOS image sensor according to the further independent claims.

Further embodiments are indicated in the depending claims.

According to a first embodiment a pixel sensor cell for a CMOS sensor device is provided comprising:
- a photodiode for generating photoelectrons;
- a first transfer transistor coupling the photodiode with an intermediate node and configured to be controlled by a first control signal;
- a gain reducing capacitance applied on the intermediate node;

a second transfer transistor coupling the intermediate node with a sense node and configured to be controlled by a second control signal;

an output buffer coupled with the sense node and configured to amplify a potential on the sense node.

According to a further aspect, a method is provided for operating the above pixel sensor cell, comprising the steps of:

accumulating photoelectrons in the photodiode during an integration time or allowing photoelectrons to accumulate in the photodiode during the integration time;

in a first phase, coupling the intermediate node with the sense node by means of the second transfer transistor and providing a charge threshold for accumulated photoelectrons so that only excess photoelectrons (photoelectrons which contribute to a potential which allow an overflow over the charge threshold) are allowed to pass/flow to the intermediate node, wherein the potential generated by the excess photoelectrons is read out as an HDS sampling output signal;

in a second phase, controlling the second transfer transistor to set a threshold of the second transfer transistor to a potential where the second transfer transistor forms an electrical isolation between the intermediate node and the sense node and which is substantially equal or higher than the potential of the intermediate node, coupling the intermediate node with the sense node and reading out the potential on the sense node as a LLS sampling output signal.

One idea of the above pixel sensor cell is to use a combination of a gain reducing capacitance and a first and second transfer transistors, particularly MOSFET transistors, to couple the preferably pinned photodiode with a sense node wherein the gain reducing capacitance may particularly be explicitly or intrinsically formed e.g. as a p+n junction and is separated from the sense node by the second transfer transistor. This allows the reduction of the noise by reducing the sense node capacitance by isolating it from the first transfer gate and the gain reducing capacitance.

Moreover, the saturation level of the pixel sensor cell is enhanced by providing an intermediate node with the gain reducing capacitance to be merged or isolated from the sense node by means of the second transfer transistor. Thereby, a high dynamic read-out can be performed by using the gain reducing capacitance. Further, a low-light sampling is also possible by having the integrated charge of the pinned photodiode directly flown into the sense node through the first and second transfer transistors. In difference to the state of the art high dynamic pixel sensor cells, the sense node is isolated from the first transfer transistor and further components by means of the second transfer transistor. In other words, the second transfer transistor decouples the sense node from the rest of the circuitry which results in an important reduction of the sense node capacitance and a lower read-out noise.

By closing (herein understood as making conductive) the second transistor, the sense node is merged with the gain reducing capacitor, which increases the sense node capacitance, reduces the pixel conversion gain and increases the saturation level.

The above method of operating a pixel sensor cell exploits the fact that the transfer transistors can be operated with analogue inputs defining potential levels for the photoelectrons path starting in the photodiode, the first transfer transistor, the gain reducing capacitance and the second transfer transistor to the sense node during the read-out steps. The potential levels for thresholds which can be applied to beneficially implement a multi-step read-out scheme which allows the definition of several phases to interpret a photosignal.

For the first read-out step, the first transfer gate is controlled to provide a charge threshold for photoelectrons generated in the pinned photodiode. The charge threshold defines a saturation level and corresponds to an amount of photoelectrons for a low-light signal read-out. The second transfer transistor is controlled to be conductive, thereby merging the sense node with the intermediate node coupled with the gain reducing capacitor. Under low-light condition, the generated photoelectrons remain in the photodiode since the photodiode charge remains below the saturation level of the first transfer transistor, i.e. below the charge threshold formed thereby. Under high-dynamic conditions, photoelectrons are generated in the photodiode above saturation level, so that the generated photoelectrons overflow the charge threshold formed by the first transfer transistor into the merged intermediate and sense nodes which have been reset to a higher potential and lowers the node potential. The sense node then can be read out to obtain a first sampling output.

In a second read-out step for reading out a low-light signal, the generated photoelectrons cannot pass the potential barrier of the first transfer transistor so that in a second read-out step, the photoelectron charge stored within the photodiode needs to be measured.

The second read-out step requires a preparation of the sense node for the read-out of the low-light signal. This includes that the sense node is firstly isolated from the intermediate node by controlling the second transfer transistor to be opened (herein understood as making non-conductive) and that the intermediate node potential is reset to a level between the potential of the photodiode and the reset level of the sense node which has been reset before. Then, the second transfer transistor is controlled to adapt its charge threshold (saturation level) to be equal or slightly higher than the intermediate node potential. In this configuration, the sense node is still isolated from the intermediate node so that a reference potential of the sense node can be read out as a second sampling output.

In a third read-out step, the first transfer transistor is controlled to lower the threshold to a voltage between the pin voltage of the photodiode and the present intermediate node potential. The photoelectrons are then transferred directly to the sense node and reduce its node potential. The third sampling output can then be read out and differentiated with the reset sampling output taken before.

This multi-step read-out scheme allows a read-out for two different dynamic ranges, firstly a high-dynamic range and secondly a low-light range. The read-out steps came along with different conversion gains so that a wide dynamic range can be achieved by maintaining a low noise read-out for the low-light signal.

Furthermore, a reset transistor may be provided which is configured to receive a reset signal and to selectively couple a supplied reset voltage to the intermediate node.

According to an embodiment, a control unit may be provided to control operation of the pixel sensor cell by timely providing the first and second control signal.

Furthermore, the output buffer may be formed with a selectable source follower.

Regarding the method, a cell output may be determined depending on the LLS sampling output signal and the HDS sampling output signal.

It may be provided that after the first phase a first reset potential is loaded on the sense node and a second reset potential $V_{RST2}$ which is in a range between a pin voltage $V_{pin}$ of the photodiode 11 and the first reset potential.

After resetting the sense node and after the threshold of the second transfer transistor has been set to a potential where the second transfer transistor isolates the intermediate node and the sense node and which is substantially equal or higher than the potential of the intermediate node, a reference sampling output signal is read out, wherein the cell output is further determined depending on the reference sampling output signal.

Particularly, after reading out the potential on the sense node as an LLS sampling output signal, the second transfer transistor is controlled to electrically merge the intermediate node and the sense node, the intermediate and sense nodes are reset onto the first reset potential.

According to a further aspect, a CMOS image sensor including an array of multiple pixel sensor cells as described above is provided.

BRIEF DESCRIPTION OF THE DRAWINGS

Embodiments are described in more detail in conjunction with the accompanying drawings in which.

DESCRIPTION OF EMBODIMENTS

Figure 1:
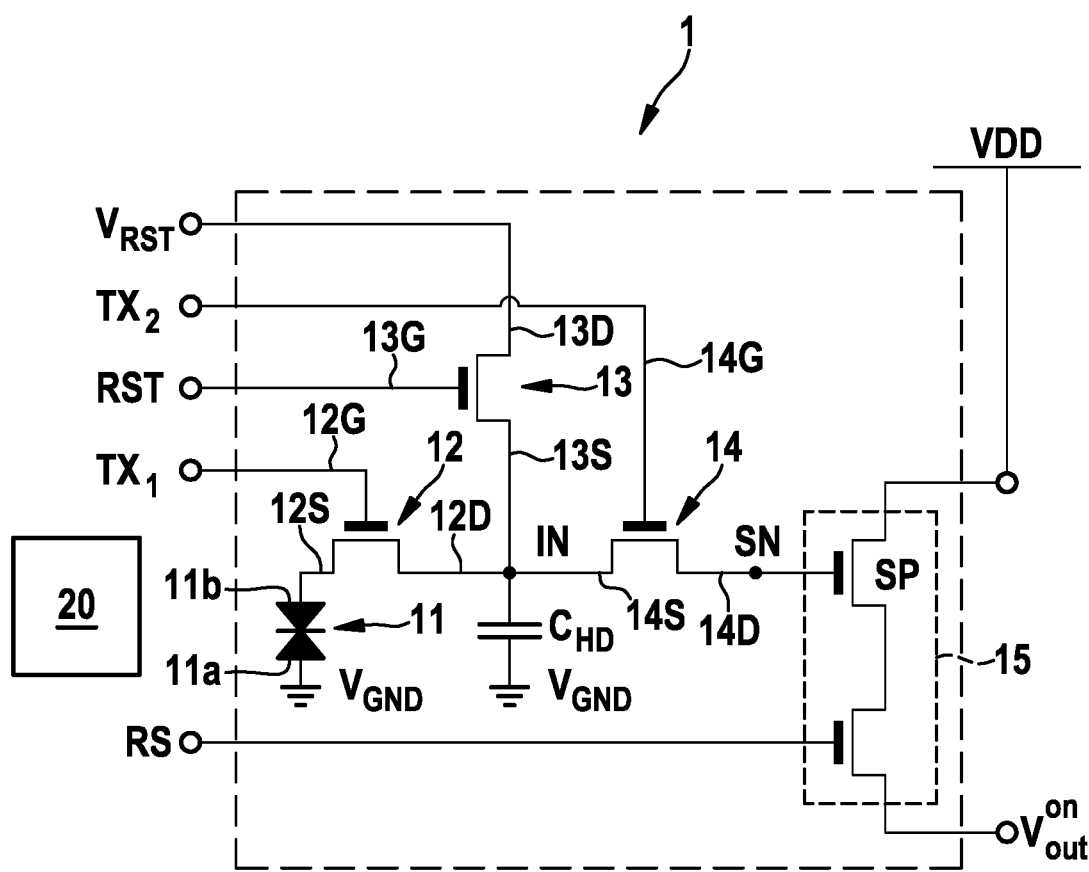
FIG. 1 shows a schematic of the pixel sensor cell.

FIG. 1 depicts a schematic of a pixel sensor cell 1 that has an increased dynamic range and a reduced read-out noise.

As shown in the exemplary circuit of FIG. 1, there is a pinned photodiode 11 substantially formed by a reversely coupled pn junction, a ground terminal 11a of which is connected to a ground potential $V_{GND}$ and a pin terminal 11b is coupled with a source terminal 12S of a first transfer transistor 12. A gate terminal 12G of the first transfer transistor 12 is applied with a first control signal $TX_1$, and a drain terminal 12D is coupled to an intermediate node IN.

The intermediate node IN is coupled with a gain reducing capacitance $C_{HD}$ which may be explicitly or intrinsically formed e.g. by an n+p junction layer. The intermediate node IN is further coupled with a source terminal 13S of a reset transistor 13. A drain terminal 13D of the reset transistor 13 is supplied by a reset voltage $V_{RST}$. The gate terminal 13G of the reset transistor 13 is coupled with a supplied reset signal RST.

The intermediate node IN is further coupled with a source terminal 14S of a second transfer transistor 14, while a drain terminal 14D of the second transfer transistor 14 is coupled with a sense node SN. The gate terminal 14G of the second transfer transistor 14 is supplied with a second control signal $TX_2$.

Furthermore, the sense node SN is coupled with a read-out buffer 15 which is formed in the present embodiment by a selectable (can be enabled and disabled) source follower. The selectable source follower of the read-out buffer 15 may comprise a source follower transistor 16 and a row selection transistor 17 which may be controlled by a row select signal RS to enable the source follower. A drain terminal 16D of the source follower transistor 16 is coupled with a high supply potential VDD, while the source terminal 16S of the source follower transistor 16 is coupled with a drain terminal 17D of the selection transistor 17, while the source terminal 17S of the selection transistor 17 is coupled with an output node ON for obtaining sampling outputs. The gate terminal 16G of the source follower transistor 16 is connected with the sense node SN.

The control signals $TX_1$, $TX_2$, RST, RS as well as the reset potential $V_{RST}$ are provided by a control unit 20 which controls the read-out operation of the pixel sensor cell 1. The control unit 20 controls the operation of the pixel sensor cell 1 to obtain sampling outputs at the sampling node ON.

Figure 2:
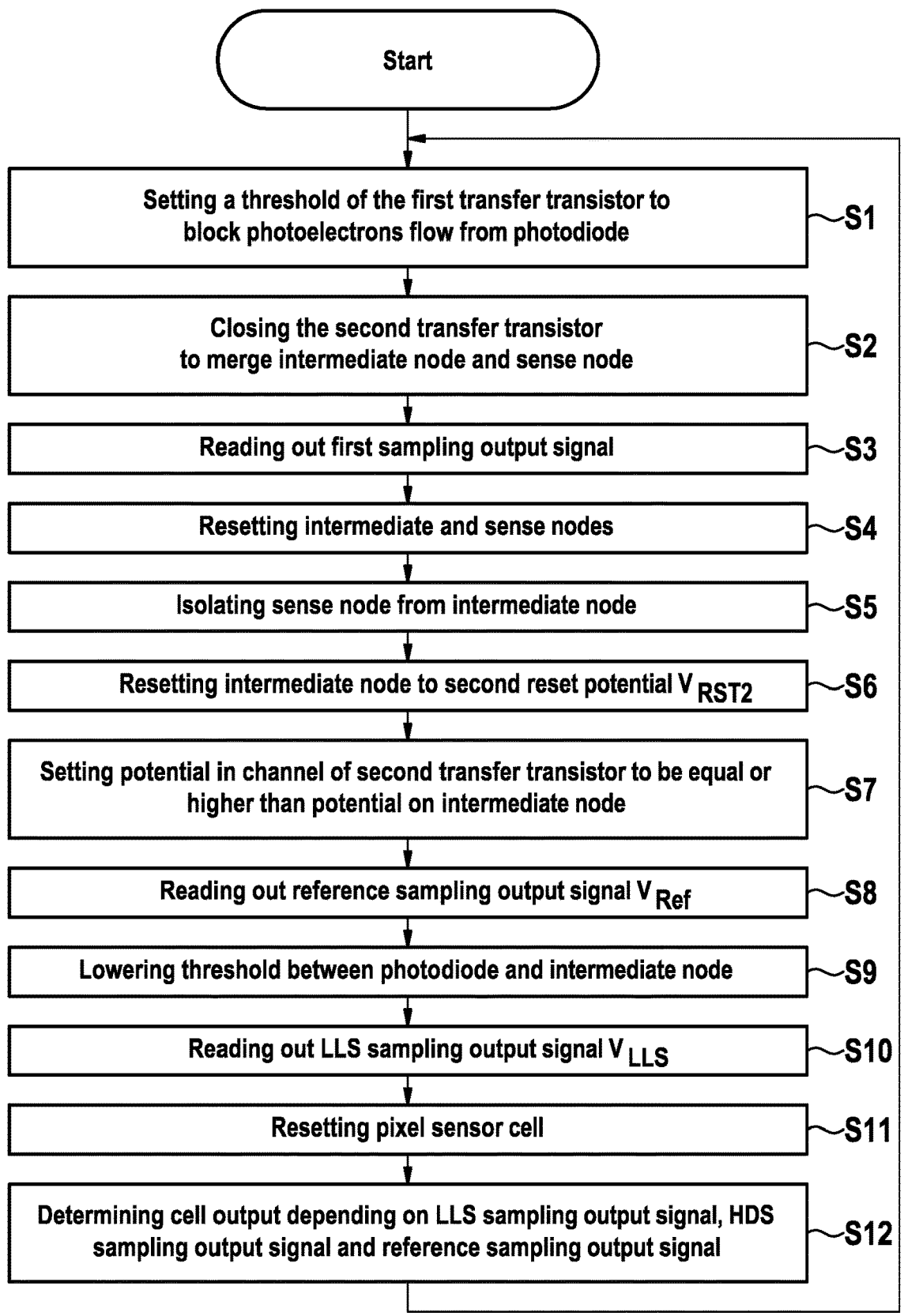
FIG. 2 a flowchart for illustrating the operating method for the pixel sensor cell of FIG. 1.
Figure 3:
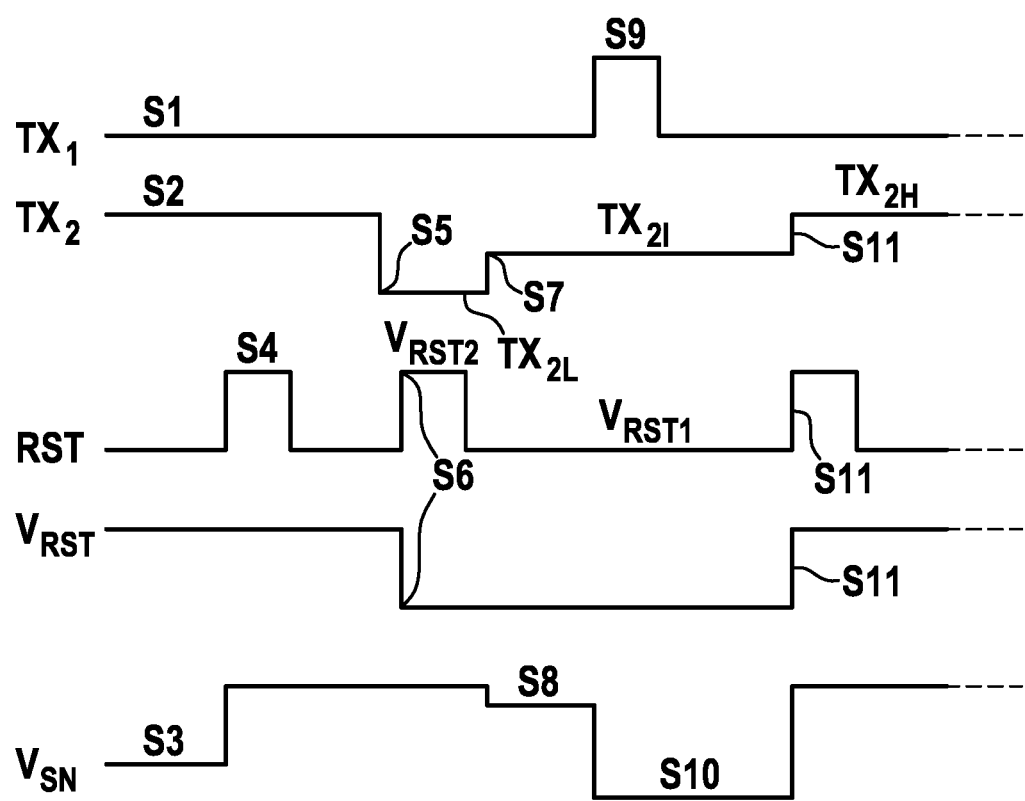
FIG. 3 shows a timing diagram of signals to control the operation of the pixel sensor cell of FIG. 1.

The operation of the pixel sensor cell 10 is described in detail with respect to the flowchart of FIG. 2, the timing diagram of FIG. 3 and the potential levels in the photoelectron's path of FIGS. 4a to 4f.

Initially, the intermediate node IN and the sense node SN had been reset to a well-defined potential. So, the potential of the intermediate and sense nodes IN, SN corresponds substantially to the reset potential $V_{RST}$.

Figure 4:
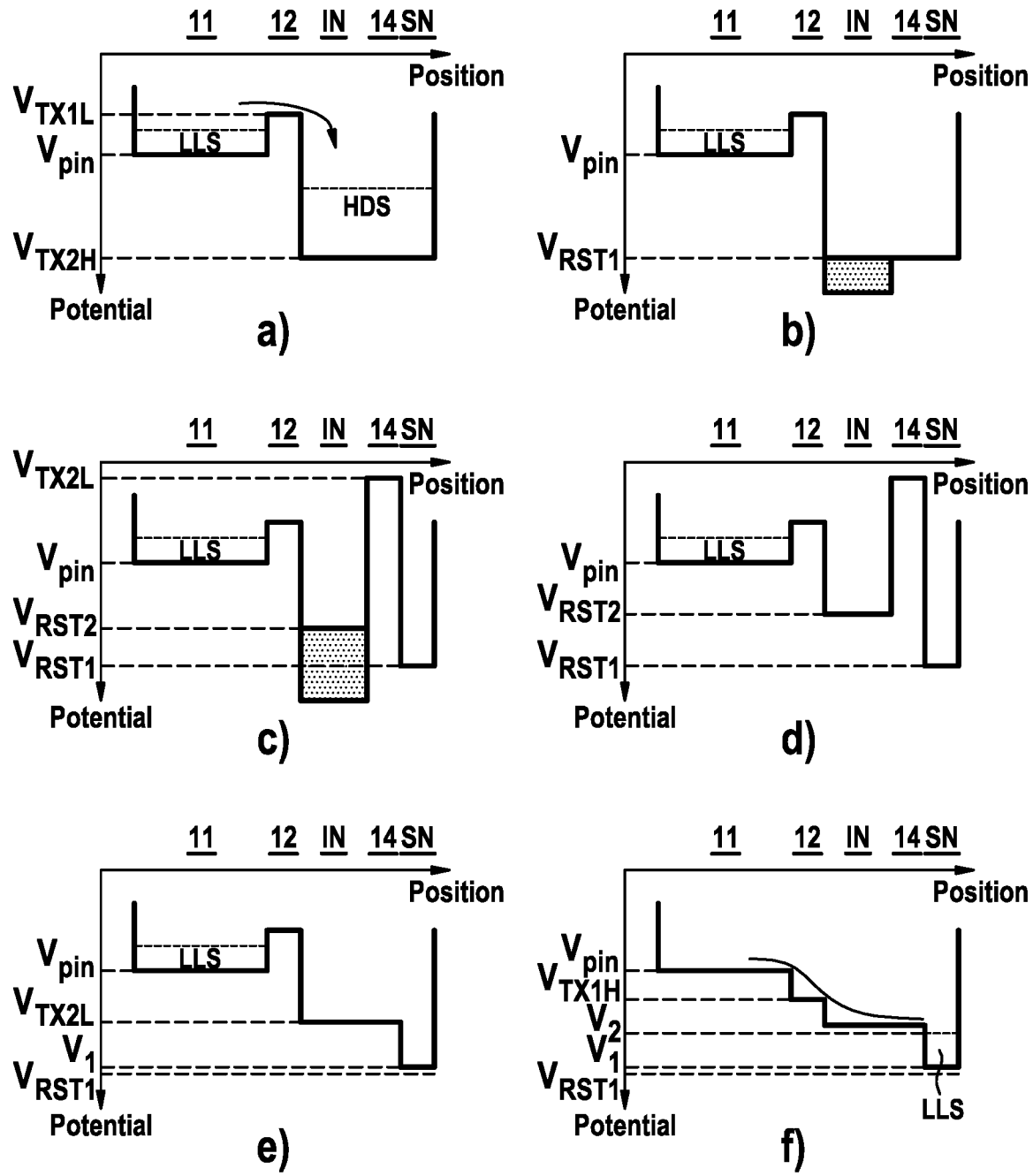
FIGS. 4a to 4f show potential levels for the photoelectrons' path from the photodiode to the sense node during the read-out steps.

In a step S1 which is also illustrated in FIG. 4a, a threshold TX1L (potential barrier) of the first transfer transistor 12 is set. This is achieved by setting the first control signal $TX_1$ to a low voltage that blocks charge flow from the photodiode 11 and allows filling the photodiode 11 with an amount of photoelectrons (pin potential $V_{pin}$) below the saturation level. In other words, the first transfer transistor 12 is controlled that it forms a potential barrier which isolates the photodiode 11 from the merged intermediate and sense nodes IN, SN when photoelectrons are generated in the photodiode 11. The charge threshold defined by the control of the first transfer transistor 12 by means of the first control signal $TX_1$ defines a saturation level of a low-light signal.

In step S2, the second transfer transistor 14 is made conductive, so that the intermediate node IN and the sense node SN are coupled/merged. This is achieved by setting the second control signal $TX_2$ to the highest voltage attracting electrons in the channel area of the second transfer transistor 14 and making the threshold level VTX2H very low.

Under low light conditions, the integrated photoelectrons corresponding to (resulting from) the Low Light Signal (LLS) remain stored in the photodiode 11 as charge generation is too slow for the potential of the photodiode 11 to reach the saturation level. In other words, the gate voltage (of the first control signal $TX_1$) applied on the first transfer transistor 12 is set to a potential where it prevents the photoelectrons to flow to the intermediate node IN as long as the accumulated charge in the photodiode 11 has not reached a saturation level defined by the potential of the first control signal $TX_1$.

Under high-light conditions, more photoelectrons are generated during integration time so that the charge in the photodiode 11 overflows as it reaches the saturation level and a part (the overflow) of the generated photoelectrons may pass through the first transfer transistor 12 to the higher potential of the intermediate node IN and the sense node SN which are merged via the conductive second transfer transistor 14.

In a step S3, the sense node SN potential is read-out by means of the output buffer 15 as a first sampling output signal $V_{HDS}$, when the row select signal RS activates the output buffer 15. The potential at the sense node SN results from the charge of the photoelectrons which could pass over the saturation level formed by the control of the first transfer transistor 12 in case of high-light conditions. Under low-light conditions, the first sampling output signal $V_{HDS}$ has a potential associated with the reset potential on the sense node SN indicating the low light condition.

The high dynamic capacitance formed by the gain reducing capacitance $C_{HD}$ is allowed for high light conditions as the shot noise dominates the read noise. Further a large capacitance is beneficial to ensure a high saturation level which is obtained by merging the gain reducing capacitor $C_{HD}$ with the MOSFET capacitor of the second transfer transistor 14 and the sense node SN. In low light condition, the photodiode 11 is not completely filled with photoelectrons, and the integrated charge remains in the photodiode 11. In this case, the read noise is the dominating noise source, and a small capacitance at the sense node SN is required.

After the HDS sampling output signal $V_{HDS}$ has been obtained, a second phase starts in case the light signal is a low light signal so that the amount of remaining charge carriers in the photodiode 11 has to be determined.

In step S4, as also shown in FIG. 4b, by applying of the reset signal RST (high level) on the reset transistor 13 a first reset potential $V_{RST1}$ is loaded on the merged intermediate node IN and sense node SN, so that the sense node SN has a predefined potential $V_{RST1}$.

After resetting the electrically merged intermediate and sense nodes IN, SN to the first reset potential $V_{RST1}$, in a next step S5, the sense node SN is isolated from the intermediate node IN by controlling the second transfer transistor 14 so that it forms a high threshold (high potential barrier) $V_{TX2L}$. The threshold $V_{TX2L}$ is selected so that the intermediate node IN when charged with the photoelectrons of the photodiode 11 remains in the intermediate node IN as shown in FIG. 4c. Substantially, the second control voltage $TX_2$ is therefore set to its lowest voltage level TX2L.

In step S6, the reset voltage $V_{RST}$ is then set to a second reset potential $V_{RST2}$ which is in a range between the pin voltage $V_{pin}$ of the photodiode 11 and the stored first reset potential $V_{RST1}$ of the sense node SN. The pin voltage $V_{pin}$ of the photodiode 11 corresponds to a built-in potential like the one of a simple pn junction diode. The pin voltage $V_{pin}$ is the voltage inside the photodiode 11 when it is completely emptied from electrons. It ranges between 0.6 and 1V and depends on the technology process.

After resetting, the reset transistor 13 is switched off in order to sample the achieved potential level at the intermediate node IN as shown in FIG. 4d. The reset potentials in the intermediate node IN and sense node SN are set to be not equal to ensure that the two nodes are not electrically merged. In case of equal node potentials, the total capacitance of the sense node SN will be the sum of the capacitances of the two nodes SN, IN. With differing reset potentials in the nodes IN, SN the sense node capacitance can be kept as low as possible.

In step S7, the second control signal $TX_2$ is set to a potential TX2l that makes the potential in the channel of the second transfer transistor 14 equal or slightly higher than the potential of the intermediate node IN as shown in FIG. 4e. In this switching state, the potential of the intermediate node IN is still isolated from the sense node SN so that the higher charge VRST2 of the intermediate node IM can be prevented to flow to the sense node SN even before the first transfer transistor 12 is fully closed. Any charge leaking from the sense node SN during this step just changes slightly the voltage of the sense node SN from VRST1 to a slightly lower value V1. This does not affect the signal because the latter corresponds to the difference between that value V1 and the sense node voltage after the $TX_1$ is clocked high to remove the barrier between the photodiode 11 and the other nodes IN, SN. Also, by a simple calibration it is possible to obtain the exact voltage to apply on the $TX_2$ to have the voltage in the channel of the second transfer transistor 14 exactly equal to VRST2.

In step S8, the potential of the sense node SN can be read out as a reference sampling output signal $V_{Ref}$ which serves as a reference for analyzing a LLS sampling output $V_{LLS}$.

In a step S9, the first control signal $TX_1$ is controlled so that the threshold between the photodiode 11 and the intermediate node IN is lowered to a level between the pin voltage $V_{pin}$ of the photodiode 11 and the potential of the intermediate node IN. The photoelectrons accumulated in the photodiode 11 transfer directly to the sense node SN and reduce its voltage as shown in FIG. 4f. Substantially, this is achieved by increasing the potential of the first control signal $TX_1$ to TX1H to a level that set the voltage in the channel to a value between the pin voltage $V_{pin}$ of the photodiode 11 and the potential of the intermediate node IN. The photogenerated charges accumulated in the photodiode 11 transfer directly to sense node SN and reduce its voltage.

In step S10, the LLS sampling output signal $V_{LLS}$ can be read-out.

In step S11, the pixel sensor cell 1 is reset by controlling the second transfer transistor 14 to electrically merge the intermediate node IN and the sense node SN, set the reset voltage $V_{RST}$ to the first reset potential $V_{RST1}$ and apply the reset signal RST to bring the intermediate and sense nodes IN, SN onto the first reset potential $V_{RST1}$ to set the initial condition.

Hence, three sampling outputs, namely the HDS sampling output signal $V_{HDS}$, the reference sampling output signal $V_{RST}$, and the HDS sampling output signal $V_{LLS}$, can be obtained at the end of each read-out process. The HDS sampling output signal $V_{HDS}$ corresponds to the high dynamic condition signal, the reference sampling output signal $V_{ref}$ corresponds to the reset level and the LLS sampling output signal $V_{LLS}$ corresponds to a low-light condition signal.

Figure 5:
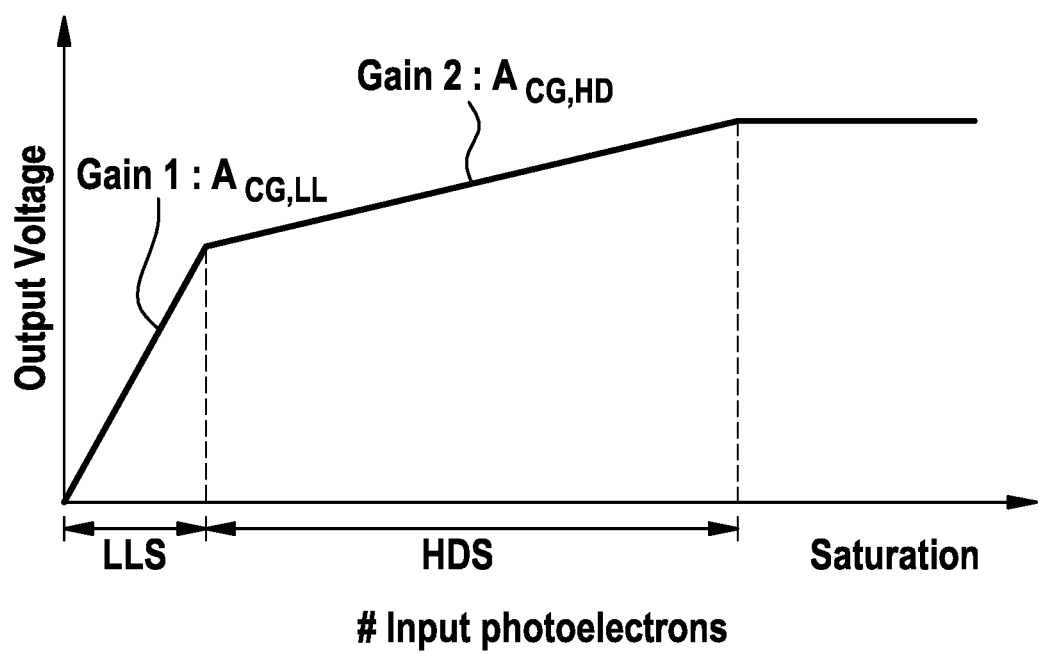
FIG. 5 shows a diagram illustrating the conversion gate with two linear ranges.

In step S12, the overall cell output can now be determined by the sum of the two components as $$V_{out} = (V_{HDS} - V_{ref}) + \frac{A_{CD,HD}}{A_{CD,LL}}(V_{LLS} - V_{ref})$$

where $A_{CG,HD}$ and $A_{CG,LL}$ correspond to the pixel conversion gains for the high dynamic signal and low-light signal read-outs, respectively. The conversion gain is generally determined by $$A_{CG} = \frac{\frac{1}{n}}{C_{SN} - \frac{2}{3n}C_{ox}WL}.$$

wherein n is the slope factor of the read-out buffer 15, $C_{SN}$ the sense node capacitance $C_{OX}$ is the oxide capacitance per unit area, and W and L are its gate width and length (of the source follower transistor 16). As shown in the diagram of FIG. 5, the sense node capacitance $C_{SN}$ is much smaller during the low-light signal read-out so that $A_{CG,LL}$ is much larger than $A_{CG,HD}$.

The overall cell output is a representation of the amount of light detected by the pixel sensor cell 1 and can be further processed.

Figure 6:
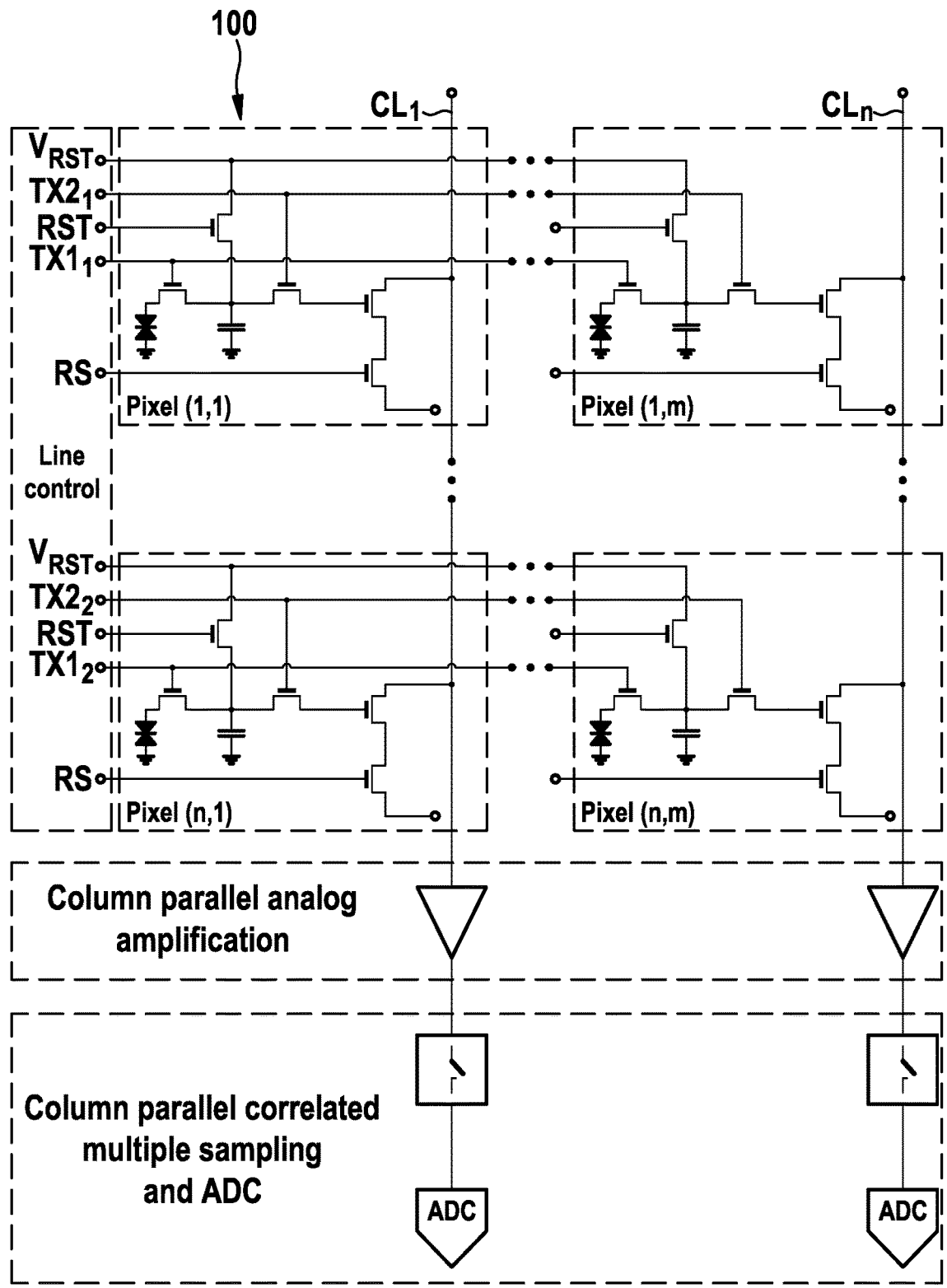
FIG. 6 shows a block diagram of a low-noise, high-dynamic CMOS image sensor including the pixel sensor cells of FIG. 1.

FIG. 6 shows a configuration of a CMOS image sensor 100, having a plurality of pixel sensor cells 1 arranged in an array. The pixel sensor cells 1 are arranged in rows wherein each row is addressed by its first and second control signals $TX_{1\_1 \ldots n}$, $TX_{2\_1 \ldots n}$, reset signal $RST_{1 \ldots n}$ and row select signal $RS_{1 \ldots n}$, while each one of the pixel sensor cells 1 of each row have coupled its output nodes ON with a respective column line $CL_{1 \ldots m}$. A column line is coupled with a column level amplifier and the multiple sampling and ADC unit.

The invention claimed is:

1. A method for operating a pixel sensor cell comprising:
   a photodiode for generating photoelectrons;
   a first transfer transistor coupling the photodiode with an intermediate node in response to a first control signal;
   a second transfer transistor coupling the intermediate node with a sense node in response to a second control signal;
   wherein the method comprises:
      accumulating photoelectrons in the photodiode during a predetermined integration time, the first transfer transistor coupling the photodiode with the intermediate node in response to the first control signal;
      in a first phase, coupling the intermediate node with the sense node with the second transfer transistor and providing a charge threshold for accumulated photoelectrons so that only excess photoelectrons are allowed to pass to the intermediate node, wherein the potential generated by the excess photoelectrons is read out as high dynamic range sampling output signal; and
      in a second phase, controlling the second transfer transistor to set a threshold of the second transfer transistor to a potential where the second transfer transistor isolates the intermediate node and the sense node and which is substantially equal or higher than the potential of the intermediate node, coupling the intermediate node with the sense node and reading out the potential on the sense node as a low light sampling output signal; and
   wherein after resetting the sense node and after the threshold of the second transfer transistor has been set to a potential where the second transfer transistor isolates the intermediate node and the sense node and which is substantially equal or higher than the potential of the intermediate node, reading out a reference sampling output signal, wherein the cell output is further determined depending on the reference sampling output signal.

2. The method according to claim 1, wherein the pixel sensor cell further comprises:
   a gain reducing capacitance applied on the intermediate node;
   an output buffer coupled with the sense node and configured to amplify a potential on the sense node.

3. The method according to claim 2, wherein a reset transistor is provided which is configured to receive a reset signal and to selectively couple a supplied reset voltage to the intermediate node.

4. The method according to claim 2, wherein the intermediate node is provided with a gain reducing capacitance which particularly is formed as a p+n junction.

5. The method according to claim 2, wherein a control unit is provided to control operation of the pixel sensor cell by timely providing the first and second control signal.

6. The method according to claim 2, wherein the photodiode is formed as a pinned photodiode.

7. The method according to claim 2, wherein the transistors are formed as MOSFET transistors.

8. The method according to claim 2, wherein the output buffer is formed with a selectable source follower.

9. The method according to claim 2, further comprising a CMOS image sensor including an array of multiple pixel sensor cells.

10. The method according to claim 1, wherein a cell output is determined depending on the low light sampling output signal and the high dynamic range sampling output signal.

11. The method according to claim 10, wherein after the first phase a first reset potential is loaded on the sense node and a second reset potential which is in a range between a pin voltage pin of the photodiode and the first reset potential.

12. The method according to claim 11, wherein after reading out the potential on the sense node as the low light sampling output signal, the second transfer transistor is controlled to electrically merge the intermediate node and the sense node, reset the intermediate and sense nodes onto the first reset potential.

\* \* \* \* \*